United States Patent
Parkes

[11] 3,777,590
[45] Dec. 11, 1973

[54] RACK AND PINION STEERING GEAR

[75] Inventor: Jeffrey George Ernest Parkes, Sawbridgeworth, England

[73] Assignee: Ford Motor Company, Dearborn, Mich.

[22] Filed: May 15, 1972

[21] Appl. No.: 253,223

[52] U.S. Cl.................................... 74/498, 308/70
[51] Int. Cl......................... B62d 1/20, F16c 25/00
[58] Field of Search ............... 74/498, 422; 308/70, 308/71

[56] References Cited
UNITED STATES PATENTS

| | | | |
|---|---|---|---|
| 833,933 | 10/1906 | Law ................................. | 74/498 X |
| 3,195,466 | 7/1965 | Young ............................. | 308/70 X |
| 3,420,586 | 1/1969 | Gerner............................. | 308/70 |
| 2,517,231 | 8/1950 | Paul................................. | 308/70 |
| 3,009,747 | 11/1961 | Pitzer.............................. | 308/71 |
| 3,585,875 | 6/1971 | Adams............................. | 74/422 |

Primary Examiner—Leonard H. Gerin
Attorney—Keith L. Zerschling et al.

[57] ABSTRACT

A bearing assembly for a rack and pinion steering gear having a pair of conical plastic bearing rings that engages a pair of metallic bearing rings. The bearing assembly supports the pinion of the steering gear against both radial and axial loads.

6 Claims, 1 Drawing Figure

PATENTED DEC 11 1973　　　　　　　　　　　　　3,777,590
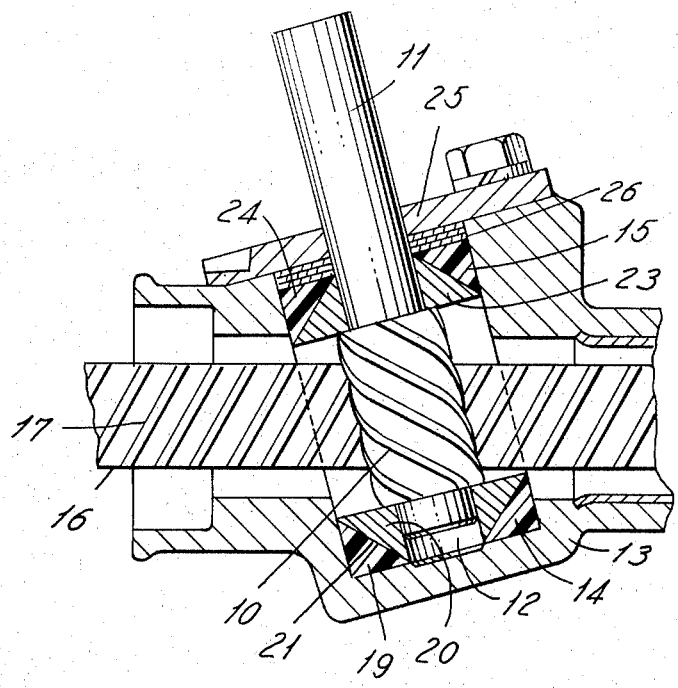

3,777,590

RACK AND PINION STEERING GEAR

BACKGROUND OF THE INVENTION

This invention relates to a rack and pinion steering gear for motor vehicles.

In many existing rack and pinion steering gears, helical pinion gear teeth mesh with inclined rack teeth so that axial loads are imparted to the pinion when the gear is in use. It is essential, therefore, that the bearings used to support these pinions in the housing provide adequate axial support for the pinion. It is conventional to use ball bearings to support the pinion. The present invention is concerned, in part, with an improved form of bearing.

BRIEF SUMMARY OF THE DISCLOSURE

According to one embodiment of the invention, a rack and pinion steering gear has the following features:

a. a pinion is supported for rotation in a housing and located axially in the housing by first and second bearings, one at each end of the pinion;

b. each bearing includes a metal bearing ring and a plastic bearing ring having conical bearing surfaces in rubbing contact at an angle of between 35° and 60° to the axis of the pinion; and c. the bearing surfaces of the first bearing are oppositely inclined to the bearing surfaces of the second bearing.

BRIEF DESCRIPTION OF THE DRAWING

The invention will now be described with reference to the accompanying drawing, the single FIGURE of which is a sectional view of a rack and pinion steering gear embodying the invention.

DETAILED DESCRIPTION OF THE PRESENTLY PREFERRED EMBODIMENT

Referring to the drawing, where the presently preferred embodiment of this invention is illustrated, a rack and pinion steering gear includes a pinion gear 10 fixed to or formed integrally with a pinion shaft 11. The pinion shaft is supported in a cylindrical recess 12 in a housing 13 by a first bearing assembly 14 and a second bearing assembly 15.

A rack 16, mounted for longitudinal sliding movement in the housing 13, has inclined rack teeth 17 in mesh with helical gear teeth on the pinion 10. The ends of the rack 16 are constructed to be connected to the steering arms of a vehicle steering linkage system in a convention fashion.

The first bearing assembly 14 includes a plastic bearing ring 19 of triangular section and a metal bearing ring 20 of complementary triangular section. The plastic and metallic bearing rings 19 and 20 have conical bearing surfaces 21 in sliding contact. The surfaces 21 are inclined to the axis of the pinion at an angle of between 35° to 60° and preferably 45°.

The plastic bearing ring 19 is seated in the closed end of the cylindrical recess 12 formed in the housing 13. The metal bearing ring 20 is seated on the end of the pinion shaft 11 abutting one end of the pinion gear 10.

The second bearing assembly 15, similarly constructed to the first bearing 14 but having reversed geometry, includes a metal bearing ring 23 mounted on the pinion shaft 11 and abutting the other end of the pinion 10. A plastic bearing ring 24 fits snugly in the cylindrical recess 12 and is held in place by a cover plate 25 bolted to the housing 13. The cover plate 25 closes the cylindrical recess 12 and has an opening through which the shaft 11 extends. Shims 26 are interposed between the cover plate 25 and the plastic bearing ring 24 to take up any end play of the bearings which may otherwise occur.

The bearing surfaces of the second bearing assembly 15 are also inclined to the axis of the pinion 10 at an angle of between 35° to 60° and preferably 45° but in the opposite sense to the angle of inclination of the bearing surfaces 21 of the first bearing assembly 14.

The material for the plastic bearing rings 19 and 24 is preferably glass reinforced nylon, although other plastics material such as Teflon may be used also. The metal bearing ring is preferably steel.

The slight resilience of the plastic bearing rings 19 and 24 performs a useful function in this embodiment of the invention. The conical bearing surfaces permit the pinion 10 to be supported against both axial and radial loads.

The foregoing description presents the presently preferred embodiment of this invention. Alterations and modifications may occur to those skilled in the art which will come within the scope and spirit of the following claims.

I claim:

1. A bearing system for the pinion of a rack and pinion steering gear comprising a housing having a cylindrical recess, a pinion gear mounted on said shaft, said bearing system comprising two bearing means, each of said bearing means comprising first and second bearing elements having conical bearing surfaces in sliding engagement, said first bearing elements engaging said pinion gears and said second bearing elements engaging said housing, two of said bearing elements being formed of plastic bearing material.

2. A bearing system according to claim 1 and including:

one of said bearing means being situated at one end of said pinion gear and the other of said bearing means being situated at the other end of said pinion gear.

3. A rack and pinion steering gear comprising a housing, a pinion gear having helical teeth, a rack slidably supported in said housing and having inclined teeth engaging said pinion gear teeth, a bearing system supporting said pinion gear in said housing against axial and radial displacement, said bearing system comprising two bearing means, each of said bearing means comprising first and second annular bearing elements having conical bearing surfaces in sliding engagement, said first bearing elements engaging said housing, two of said bearing elements being formed of plastic material.

4. A rack and pinion steering gear according to claim 3 and including:

a line formed at the intersection of a segment of said conical surfaces and a plane containing the axis of said pinion gear extending at an angle of between 35° and 60° to said pinion gear axis.

5. A rack and pinion steering gear according to claim 4 and including:

said line extending at a 45° angle to said pinion gear axis.

6. A rack and pinion steering gear having a housing, a rack slidably supported in said housing, said rack having teeth arranged at an inclined angle to the axis of said rack,
a pinion gear having helical teeth,
said helical teeth engaging said teeth of said rack,
a pinion shaft engaging said pinion gear,
bearing means supporting said pinion gear in said housing against axial and radial displacement,
said housing having a cylindrical recess,
said bearing means having a first bearing element seated in said first cylindrical recess,
said first bearing element having a frusto conical bearing surface,
a second bearing element engaging said pinion shaft and one end of said pinion gear,
said second bearing element having a frusto conical bearing surface engaging the bearing surface of said first bearing element,
said housing having a cylindrical bore,
a third bearing element situated in said bore and engaging the other end of said pinion gear and said pinion shaft,
said third bearing element having a frusto conical bearing surface,
said fourth bearing element situated in said bore and having a bearing surface engaging the bearing surface of said third bearing element,
closure means situated at the open end of said bore and engaging said fourth bearing element,
fastening means securing said closure means to said housing,
said fastening means and said closure means being constructed to exert an axial load on said bearing elements.

* * * * *